United States Patent Office 3,441,221
Patented Apr. 29, 1969

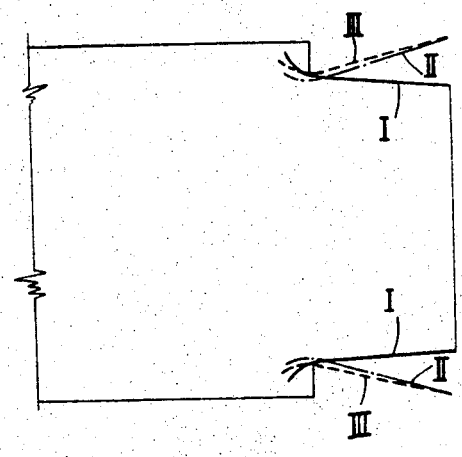
FIG.:1
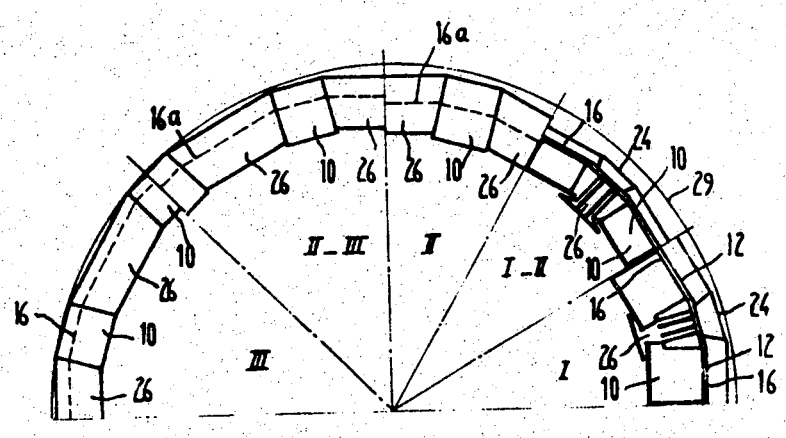
FIG.:5
Inventors
Henry Naud
René Léon Constant

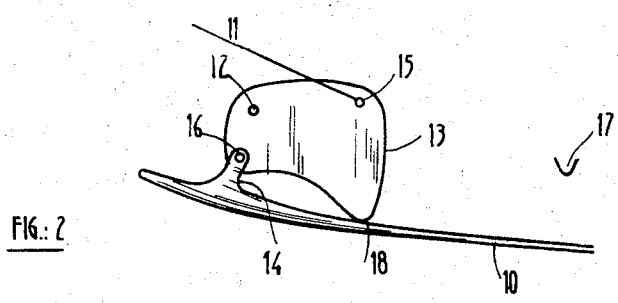
FIG.: 2
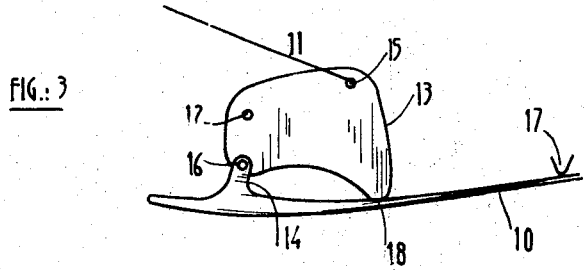
FIG.: 3
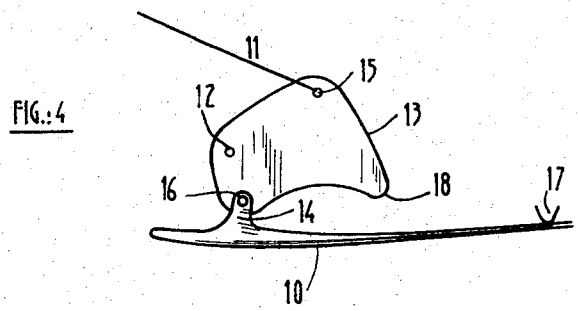
FIG.: 4

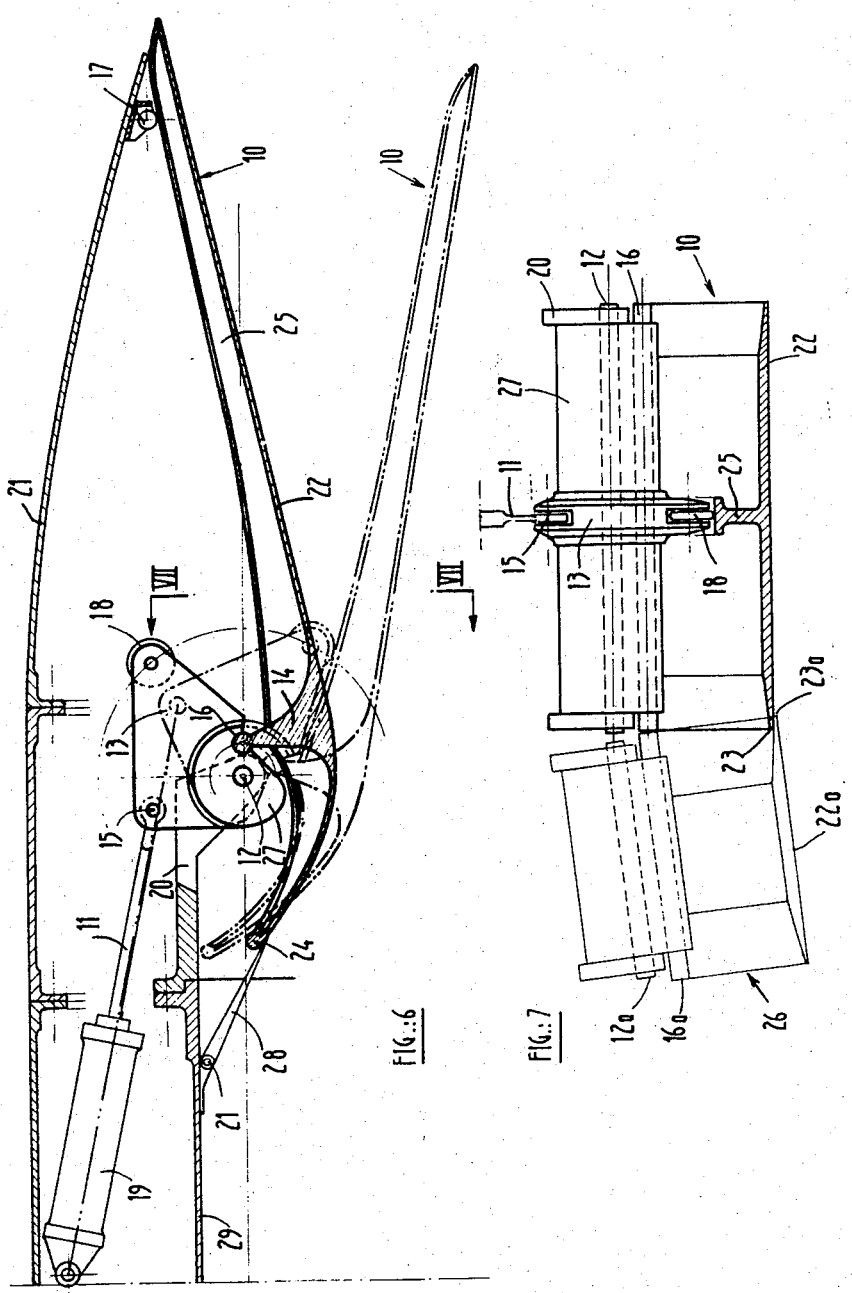

3,441,221
ARTICULATED STRUCTURE ESPECIALLY FOR JET PROPULSION NOZZLE
Henry Naud, Verrieres-le-Buisson, and René Léon Constant, La Rochette, France, assignors to Societe Nationale d'Etude et de Construction de Moteurs d'Aviation, Paris, France, a company of France
Filed July 5, 1967, Ser. No. 651,305
Claims priority, application France, July 7, 1966, 68,615
Int. Cl. B64c *15/04, 15/06;* B05b *15/08*
U.S. Cl. 239—265.35                                       6 Claims

ABSTRACT OF THE DISCLOSURE

The invention is concerned with a device capable of rotating each flap of a variable jet propulsion nozzle successively around two transverse axes near its upstream and downstream ends respectively. To each flap are associated a rotating member adapted to rotate around a stationary axis, a stationary stop and a connecting-rod for controlling the rotating member. When the connecting rod is operated the flap turns first around an axis near the stationary axis, then around the stop.

---

This invention relates to an articulated structure comprising a rigid member capable of rotating about two different axes successively.

This structure comprises the following members: a rotating member adapted to rotate about a stationary axis and bearing a second and a third axis; a stop situated outside the rotating member; a rigid member pivoted about the second axis and subjected to a return force which urges it against the stop; a driving member engaging the third axis and whose two strokes in opposite senses rotate the rotating member about the stationary axis in the two rotation senses respectively; the above mentioned members being so disposed relatively to one another as to satisfy the following conditions: in one of the two strokes of the driving member the rigid member is first pushed by the return force against the rotating member and therefore rotates therewith, it then meets the stop, against which it remains pushed by the return force and then rotates about this stop in a second rotating movement have a sense opposite to that of the first rotating movement.

The operation of the structure will be described below with reference to the drawing.

Structures according to the invention may especially be used in jet nozzles, the rigid member being an axially extending flap of the nozzle arranged at the downstream end of the nozzle.

Deformable jet nozzles are known which are made up of a plurality of mobile flaps owing to which the nozzle may pass from a converging to a diverging configuration and vice versa, the transverse inlet and exit sections of the movable portion of the nozzle being both different in the two configurations of the nozzle. In order to shift from one to the other configuration, two pluralities of jacks were used. The unit of the invention permits of using one plurality of jacks only.

Now referring to the drawing, the figures represent:
FIGURE 1, three configurations of a nozzle;
FIGURES 2, 3 and 4 an embodiment of the articulated unit according to the invention in three different configurations;
FIGURE 5 a rear end view of parts, occupying different positions, of a substantially circular nozzle comprising a structure according to the invention;
FIGURE 6 an axial cross section, to a larger scale, of a portion of this nozzle across a flap controlled as shown in FIGURES 2 to 4;
FIGURE 7 a cross section taken along line VII–VII of FIGURE 6.

In FIGURE 1, lines I, II and II schematically show three configurations of a nozzle which respectively correspond to three kinds of flight conditions of the aircraft carrying the nozzle. Configuration I has minimum inlet and outlet section areas, configuration III maximum inlet and outlet areas, and configuration II a minimum inlet area equal to inlet area of configuration I and a maximum outlet area equal to the outlet area of configuration III, the throat section being here the inlet section when a nozzle in diverging configuration (II and III) is concerned. Again the configurations of the articulated unit according to the invention which correspond to configurations I, II and III of the nozzle and the positions of the flap which is part of the unit according to the invention will be called configurations I, II and III and positions I, II and III respectively.

In FIGURES 2, 3 and 4, 13 is a rotating member which is rotatable about a stationary axis 12 and carries a second axis 16 and a third axis 15. A stop 17 is disposed outside the rotating member 13 at a place which is defined below. 10 is a flap of a deformable nozzle. It is hinged on the second axis 16 and subjected on its inward face facing the axis X—X of the nozzle, i.e. downwardly in the figures, to the pressure of the nozzle gas, which urges it against stop 17. 11 is a driving member which engages the third axis 15. It is connected to the shaft of a jack which is not shown and therefore forms a connecting rod the movement of which strongly approximates a sliding one. Depending on the sense in which it is actuated the connecting rod 11 performs one or the other of two strokes of opposed senses which rotate the rotating member 13 about the stationary axis 12 in the two opposed rotation senses.

FIGURE 2 shows the articulated unit in configuration I. The gas pressure pushes the rigid member 10 against the rotating member 13 at such place 18 thereof that the second axis 16 and the third axis 15 are situated on the two sides of the straight segment which connects the stationary axis 12 with this place and the third axis 15 is situated near the line of symmetry perpendicular to this segment.

If, starting from configuration I shown by FIGURE 2, the connecting rod 11 is pulled upwardly and to the left so as to impart to it an approximately sliding movement, the rotating member 13 rotates about the first axis 12 counter-clockwise, the rigid member 10 is permanently pushed by the gas pressure against the rotating member 13 at the place 18 thereof and turns therewith in the same sense, that is, counter-clockwise. This movement continues until the rigid member 10 abuts against stop 17 as shown by FIGURE 3. The unit is so designed that the line which connects the stationary axis 12 with the second axis 16 is approximately at right angles with the axis X—X of the nozzle. The nozzle then has its configuration II.

If the connecting rod 11 is further pulled upwardly and to the left, it continues to rotate the rotating member 13 about the stationary axis 12 counter-clockwise, which causes the second axis 16 to rise and therefore the rigid member 10 to rotate clockwise about the stop 17 until it finally occupies its position III shown in FIGURE 4. The rigid member 10 of course slightly glides along the stop 17 while rotating about it.

The structure schematically shown in FIGURES 2, 3, and 4 may be used both in a quadrangular and in a polygonal nozzle. It is especially efficient when the flaps are short.

Such a nozzle can consist of a large number of flaps limiting an outlet section of variable substantially circular area.

FIGURE 5, which shows such a nozzle, comprises five sectors bearing the references I, I–II, II, II–III and III respectively. Each sector schematically shows, seen from downstream, a portion of the same nozzle whose flaps occupy a different position in each sector. The nozzle schematically shown comprises in known manner controlled flaps and following or slave flaps alternating with and following the controlled flaps. The controlled flaps are designated 10. Each controlled flap is part of a structure according to the invention. 26 designates a following flap. It is so disposed with respect to the adjacent controlled flaps that the external face of its edges covers the internal faces of the controlled flaps so that the pressure obtaining in the nozzle applies the following flap against the controlled ones.

Sector I corresponds to configuration I of the nozzle shown by FIGURE 1. The controlled flaps 10 are seen by the observer before the following flaps between which they are situated.

Sector II corresponds to configuration II of the nozzle. The following flaps are here seen before the controlled flaps 10.

Sector I–II corresponds to the cylindrical configuration of the nozzle, which is comprised between the two configurations I and II.

Sector III corresponds to configuration III of the nozzle.

Sector II–III finally corresponds to a configuration of the nozzle comprised between the two configurations II and III.

The mobile axes about which the controlled flaps 10 and the following flaps 26 rotate respectively are shown at 16 and 16a. These axes are visible in sectors I and I–II and have been shown there in solid line. They are on the contrary hidden in sectors II, II–III and III and have therefore been shown there in broken lines.

In FIGURE 6, 29 is the cylindrical nozzle pipe and 20 designates two parallel flanges. The stationary rotation axes 12 are mounted at their extremities in two parallel successive flanges 20. The rotating members 13 here comprise a ring-shaped axis 27.

Each following flap 26 (FIGURE 7), which is narrower and higher than the controlled flap 10, is part of a structure which differs from that shown in FIGURE 6 and in the right part of FIGURE 7 essentially in that it does not comprise the connecting-rod 11 and the hydraulic jack controlling it.

The stationary axes 12 of the controlled flaps 10 and the stationary axes 12a of the following flaps 26 succeed each other alternately at the periphery of the nozzle so as to form a polygon the sides of which have as alternating lengths the transverse widths of the controlled and of the following flaps, as appears from FIGURE 7.

In order to avoid excessive leaks between the flaps 10 or 26 and the nozzle pipe 29 in the intervals between the axes 12 and 12a, there may be arranged upstream of the flaps 10 and 26 a ring of transverse overlapping flaps 28 hinged on tangential axes 21 carried by the nozzle pipe 29, the end of these flaps 28 being held in contact with the upstream edge 24 of the flaps 10 and 26 by return springs also secured to the nozzle pipe 29 or by torsion springs.

23 is the lateral edge of the sole 22 of flap 10 and 23a the edge of the sole 22a of flap 26. As shown by FIGURE 7 these two edges are in engagement, which provides for fluid tightness between the two flaps. The soles 22 have such lengthwise and transverse curves that the soles edges are engaged over their whole lengths for all openings of the nozzle. The edge 23a is applied against the edge 23 by the gas pressure in the nozzle, the axis 12a of the following flap rotating in the flanges 20.

We claim:

1. An articulated structure comprising the following members: a rotating member adapted to rotate about a stationary axis and bearing a second and a third axis; a stop situated outside the rotating member; a rigid member pivoted about the second axis and subjected to a return force which urges it against the stop; a driving member engaging the third axis and whose two strokes in opposite senses rotate the rotating member about the stationary axis in the two rotation senses respectively; the above mentioned members being so disposed relatively to one another as to satisfy the following conditions: in one of the two strokes of the driving member the rigid member is first pushed by the return force against the rotating member and therefore rotates therewith, it then meets the stop, against which it remains pushed by the return force and then rotates about this stop in a second rotating movement having a sense opposite to that of the first rotating movement.

2. A jet propulsion nozzle comprising structures according to claim 1, the rigid member to be operated in each structure being a mobile flap of the nozzle.

3. A jet propulsion nozzle according to claim 2 in which the second and third axes are situated on the two sides respectively of the diagonal line which connects the stationary axis with the place of the rotating member where the rigid member rests on the rotating member, and the third axis is situated near the line of symmetry perpendicular to this diagonal line.

4. A jet propulsion nozzle according to claim 3, in which the stop occupies a position such that the extension of the diagonal beyond said place meets the stop during its rotation around the stationary axis.

5. A jet propulsion nozzle according to claim 2, in which the line which connects the stationary with the second axis is substantially perpendicular to the nozzle axis when the rigid member abuts against the stop.

6. A jet propulsion nozzle according to claim 2, the flaps of which are disposed as a polyhedron the axis of which is the nozzle axis.

References Cited

UNITED STATES PATENTS 2,934,966  5/1960  Wood _____ 239—265.33
3,387,788  6/1968  Brown _____ 239—265.39 X ALLEN N. KNOWLES, Primary Examiner.

H. NATTER, Assistant Examiner.

U.S. Cl. X.R.

239—265.39, 587